(Model.)

J. HUNT.
Carpet Lining.

No. 239,789.    Patented April 5, 1881.

WITNESSES.      INVENTOR.

UNITED STATES PATENT OFFICE.

JOSHUA HUNT, OF PROVIDENCE, RHODE ISLAND, ASSIGNOR OF ONE-HALF TO STEPHEN BROWNELL, OF SAME PLACE.

CARPET-LINING.

SPECIFICATION forming part of Letters Patent No. 239,789, dated April 5, 1881.

Application filed July 22, 1880. (Model.)

*To all whom it may concern:*

Be it known that I, JOSHUA HUNT, of the city and county of Providence, in the State of Rhode Island, have invented a new and useful Improvement in Carpet-Linings; and I declare the following to be a specification thereof, reference being had to the accompanying drawings.

Like letters indicate like parts.

Figure 1:
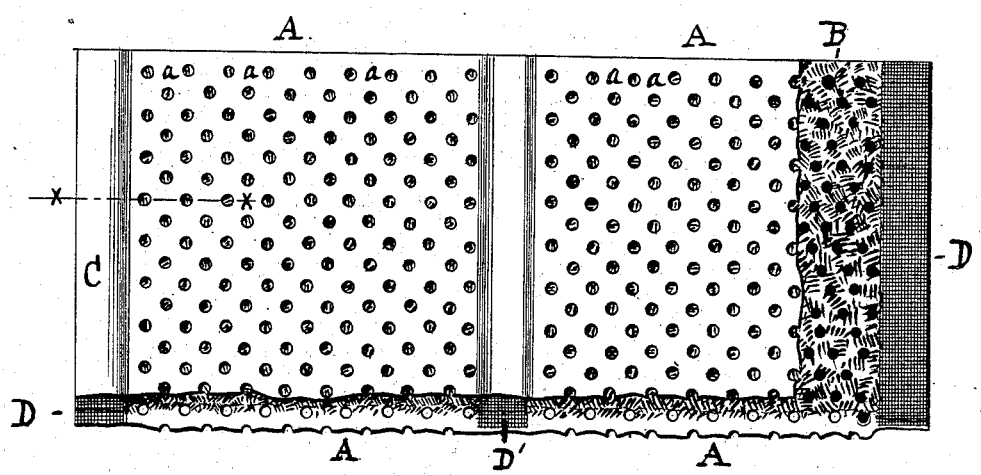
Figure 1:
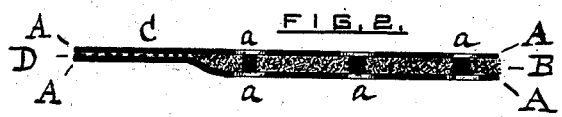

Figure 1 is a top plan of my invention, showing the several layers in position. Fig. 2 is a vertical section on the line $x\ x$.

My invention consists of two perforated layers of paper inclosing a lining of perforated pelisse-wadding, and having its selvages and center strengthened by stay-pieces, as hereinafter described.

The external layers, A, are made of sheets of Manila or other paper, having a series of perforations, $a$. The inner layer, B, is made of perforated pelisse-wadding, or perforated.

The inner layer is made preferably of less width than the outer layers, so that the selvages C of the layers A may be glued or united together. Between the selvages C of the outer layers a strip, D, of paper or cloth, may be put, to serve as a stay to strengthen the selvage and protect it from tearing, the stay-piece and selvages being glued together. A stay-piece, D', may also be placed in like manner between the layers A, along the central longitudinal line thereof, to give additional strength and firmness to the fabric, in which case the layer B is made in two strips, one on each side of the center stay, D', as shown in Fig. 1.

Paper-covered carpet-linings as usually made retain upon their upper surface the dust and dirt which has sifted down through the carpet, and so the under side of the carpet, being cut and ground by such dust and dirt, is subjected to unnecessary wear. To obviate this difficulty I provide the several layers with a series of perforations, $a$, through which the dust readily sifts below the carpet-lining to the floor.

The stay-pieces D D' give such strength and firmness to the fabric that it can be handled as readily as a carpet, and when dusty it can be shaken or beaten without injury, and so can be used repeatedly until actually worn out.

I claim as a useful and novel invention, and desire to secure by Letters Patent—

1. The improved carpet-lining herein described, consisting of two external perforated layers of paper, A, and an inner layer of perforated pelisse-wadding, B, substantially as specified.

2. The combination of the perforated layer of pelisse-wadding B with the external perforated layers of paper A, extending beyond the inner layer, B, to form the selvages C, and united by the stay-pieces D D', substantially as described.

3. The stay-pieces D D', uniting the external layers, A, of a carpet-lining, to strengthen the selvages or other parts so united, substantially as shown, and for the purpose specified.

JOSHUA HUNT.

Witnesses:
W. H. N. PRATT,
WARREN R. PERCE.